L. DE FOREST.
APPARATUS FOR AND METHOD OF RECORDING FLUCTUATING CURRENTS.
APPLICATION FILED JUNE 23, 1915.
1,177,848.
Patented Apr. 4, 1916.
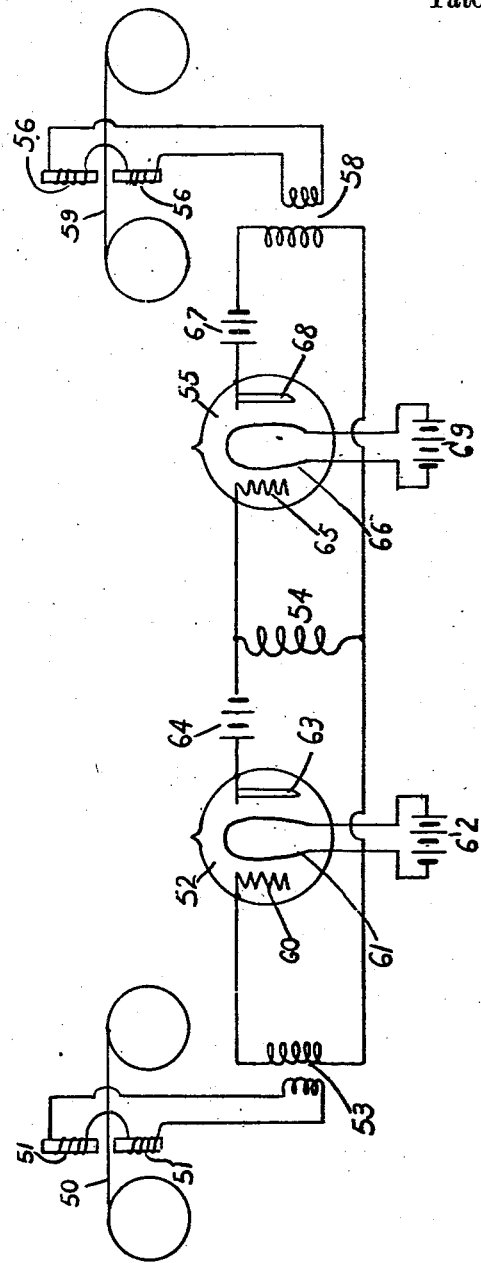

UNITED STATES PATENT OFFICE.

LEE DE FOREST, OF NEW YORK, N. Y., ASSIGNOR, BY MESNE ASSIGNMENTS, TO RADIO TELEPHONE AND TELEGRAPH COMPANY, A CORPORATION OF DELAWARE.

APPARATUS FOR AND METHOD OF RECORDING FLUCTUATING CURRENTS.

1,177,848.  Specification of Letters Patent.  Patented Apr. 4, 1916.

Original application filed June 24, 1913, Serial No. 775,529. Divided and this application filed June 23, 1915. Serial No. 35,960.

*To all whom it may concern:*

Be it known that I, LEE DE FOREST, a citizen of the United States, residing at New York, county of Bronx, and State of New York, have made a certain new and useful Invention in Apparatus for and Method of Recording Fluctuating Currents.

This invention relates to apparatus for and a method of generating weak pulsating or alternating current and amplifying the same and utilizing the amplified current to make a record of the same and embodies subject-matter divided from my application Serial No. 775,529, filed June 24, 1913.

The object of the invention is to generate and amplify weak pulsating or alternating currents and to utilize the amplified currents to make a record of the same.

A further object is to provide for the utilization of amplified weak pulsating or alternating currents for effecting a sound record corresponding to the sounds employed in initially generating the weak pulsating or alternating currents.

A further and more restricted object of the invention is to provide for the utilization of a sound record to generate weak pulsating or alternating currents and amplifying the currents and utilizing the amplified currents to reproduce the sound record.

Other objects of the invention will appear more fully hereinafter.

The invention consists substantially in the construction, combination, location, circuit arrangement and mode of operation, all as will be more fully hereinafter set forth, as shown in the accompanying drawing, and finally pointed out in the appended claims.

The single view is a diagrammatic view illustrating an arrangement for carrying out the principles of my invention.

In carrying out my invention I employ a suitable means for generating weak pulsating or alternating electric currents which may be termed "fluctuating" currents. As illustrative of one form of current generating means I have shown a telegraphone record or wire 50 which has been magnetized in the usual way by or in accordance with sound waves. This record, so magnetized is caused to influence a magnetic field, as, for instance, by being caused to move therethrough, thereby generating weak pulsating or alternating currents in the electric circuit which includes said field or which is associated therewith. In the illustrative arrangement shown the magnetized record 50 is caused to move through a magnetic field such as is afforded by electro-magnets 51, placed on opposite sides of or in any other suitable relation to the magnetized record. The result of this arrangement and operation is that weak pulsating or alternating currents are generated in the circuit of the electro-magnets, and that said currents will correspond to the magnetization of the record employed to produce them. It is to be understood, of course that in accordance with the broad scope of my invention as defined in the claims, the weak pulsating or alternating currents may be otherwise produced and may be in accord with other initiating methods.

The circuit in which the weak currents are generated is, in accordance with my invention, associated in suitable manner with an audion 52. In the illustrative arrangement shown, to which my invention is not to be limited or restricted, the association of the circuit of magnets 51 with the circuits of the audion 52 is through a transformer 53. The audion includes the usual evacuated vessel in which are the cold electrodes 60, 63, and the hot electrode 61, the circuit of the latter being supplied with current from a convenient source, such as battery 62.

While, for convenience of illustration the hot electrode 61 is shown positioned between the cold electrodes 60, 63, in practice, and ordinarily, the grid electrode 60 is located in the space between the hot electrode 61, and the cold electrode 63, so as to influence or affect the conducting condition of said space by or in accordance with current variations or electromotive force variations impressed upon the grid electrode 60. To secure such variations in current or electromotive force I employ the weak current pulsations or alternations produced as above described. Thus, in the illustrative arrangement shown, one terminal of the secondary coil of transformer 53 is connected to the electrode 60, and the other terminal of said coil is connected to one side of the circuit of the hot filament or electrode 61.

An electromotive force is impressed upon the cold plate electrode 63, in any suitable manner. In the form shown one terminal of a battery or other current source 64 is connected to the electrode 63. The other terminal of said current source is connected to one side of the circuit of the filament electrode 61. The circuit of the cold electrode 63 is associated in suitable manner with the circuits of a second audion 55. This association may be accomplished in any suitable manner, as, for instance, through the inductance coil 54 acting as a one coil or autotransformer, although my invention is not to be limited or restricted in this respect.

In like manner to the audion 52 as above described, the audion 55 includes an evacuated vessel in which are placed the cold electrods 65, 68, and the hot electrode 66, the latter being supplied with current from a suitable source 69. One terminal of the associating transformer 54 is connected to the grid electrode 65, the other terminal of said transformer being connected to one side of the circuit of filament 66. A current source 67 has one terminal connected to the cold plate electrode 68, and the other terminal thereof connected to one side of the circuit of hot electrode 66.

The currents generated in the circuit of the magnets 51, are vastly amplified by the audions above described when coupled up and associated as explained with the result that current flow, fluctuations, pulsations or alternations in the circuit of the electrode 68, are in accord with those originally delivered to the first audion, only they are now of vastly greater magnitude, and in accordance with my invention I propose to utilize the amplified currents in the production of a record thereof. This record may be of any suitable form. As illustrative of the principles involved I have shown a telegraphone record made by or in accordance with the amplified currents. In the arrangement shown this record is caused to move through a magnetic field influenced by electro-magnets 56, upon the circuit of which the amplified currents are impressed. This may be accomplished in any suitable manner, as, for instance, by suitably associating the circuit of magnets 56, with that of electrode 68. In the form shown this association is effected through a transformer coupling 58.

By the arrangement above described I am enabled to secure a record in exact accord with suitably generated weak pulsating or alternating currents only in vastly amplified or magnified degree.

Having now set forth the objects and nature of my invention, and an illustrative arrangement and operation embodying the principles thereof, what I claim as new and useful, and of my own invention and desire to secure by Letters Patent, is—

1. The method of duplicating an original magnetic sound record which consists in moving said record to produce electrical currents passing said currents through an amplifying audion, transmitting the amplified currents to an electro-magnetic device, and moving the blank magnetic record in suitable relation to the electro-magnetic device.

2. The method of producing records which consists in generating weak fluctuating currents by and in accordance with predetermined characteristics, then passing said currents through an amplifying audion, and finally employing the amplified currents to produce a record thereof.

3. The method which consists in passing weak fluctuating currents through an amplifying audion, then employing said currents to create a varying magnetic field in accordance with variations in said currents, and finally employing the varying magnetic field to produce a magnetic record of said current variations.

4. The combination with an audion for amplifying weak fluctuating currents, and magnetic devices arranged to be influenced by and in accordance with the amplified currents, of a magnetic record device arranged to be moved in the field of said magnetic devices, to be correspondingly influenced thereby.

5. The combination with an audion to amplify electrical currents of predetermined variations, of a magnetic record device, and means to influence said record device by and in accordance with the variations in the amplified currents.

In testimony whereof I have hereunto set my hand in the presence of the subscribing witnesses, on this 17th day of June, A. D. 1915.

LEE DE FOREST.

Witnesses:
WALTER A. DAILY,
MARJORIE A. GRAEVE.